United States Patent
Bosselut (10) Patent No.: US 11,759,895 B2
(45) Date of Patent: Sep. 19, 2023

(54) METHOD FOR PRODUCING A METAL REINFORCEMENT FOR A TURBOMACHINE BLADE

(71) Applicant: Mecachrome France, Amboise (FR)

(72) Inventor: Antoine Bosselut, Souvigny de Touraine (FR)

(73) Assignee: Mecachrome France, Amboise (FR)

( * ) Notice: Subject to any disclaimer, the term of this patent is extended or adjusted under 35 U.S.C. 154(b) by 0 days.

(21) Appl. No.: 17/415,067

(22) PCT Filed: Dec. 18, 2019

(86) PCT No.: PCT/EP2019/086046
§ 371 (c)(1),
(2) Date: Jun. 17, 2021

(87) PCT Pub. No.: WO2020/127551
PCT Pub. Date: Jun. 25, 2020

(65) Prior Publication Data
US 2022/0063028 A1   Mar. 3, 2022

(30) Foreign Application Priority Data

Dec. 21, 2018 (FR) ........................ 1873760

(51) Int. Cl.
*B23P 15/04* (2006.01)
*F01D 5/14* (2006.01)
*F01D 5/28* (2006.01)

(52) U.S. Cl.
CPC .............. *B23P 15/04* (2013.01); *F01D 5/147* (2013.01); *F01D 5/282* (2013.01); *F05D 2230/10* (2013.01); *F05D 2230/232* (2013.01)

(58) Field of Classification Search
CPC .......... B23P 15/04; F01D 5/147; F01D 5/282; F01D 5/288; F05D 2230/10;
(Continued)

(56) References Cited

U.S. PATENT DOCUMENTS 9,222,362 B2 * 12/2015 Ford .......................... B22F 7/06
9,279,328 B2 * 3/2016 Roy ...................... F04D 29/324
(Continued)

FOREIGN PATENT DOCUMENTS

EP      2469032 A2      6/2012
EP      2586972 A2      5/2013
(Continued)

OTHER PUBLICATIONS

Feb. 21, 2020—International Search Report of PCT/EP2019/086046.

*Primary Examiner* — Ryan J. Walters
(74) *Attorney, Agent, or Firm* — Banner & Witcoff, Ltd.

(57) ABSTRACT

The present invention concerns a metal reinforcement for a turbomachine blade comprising an aerodynamic surface which extends between a leading edge and a trailing edge, the reinforcement comprising a base (21) forming its leading edge (20) and being extended by two lateral fins (22, 23) so as to define an inner surface capable of receiving the leading edge of the blade, the method comprising the following steps: (a) obtaining at least two parts each forming at least one of the fins of the reinforcement, each part being integral and finished, at least one of the parts being produced by machining a metallic blank; (b) assembling the parts, previously positioned on a tool (8), by a technique of fusion welding or friction stir welding in order to obtain the reinforcement.

10 Claims, 5 Drawing Sheets

(58) Field of Classification Search
CPC ........... F05D 2230/232; F05D 2230/14; F05D 2220/36; F05D 2230/23; F05D 2230/53; F05D 2240/303; F05D 2300/171; F05D 2300/174; F04D 29/023; F04D 29/324
See application file for complete search history.

(56) References Cited

U.S. PATENT DOCUMENTS

| | | | |
|---|---|---|---|
| 9,828,860 B2* | 11/2017 | Schreiber | F01D 5/282 |
| 11,047,058 B2* | 6/2021 | Li | F04D 29/325 |
| 2012/0021243 A1* | 1/2012 | Kray | F01D 5/28 |
| | | | 428/602 |
| 2012/0114494 A1 | 5/2012 | Ford et al. | |
| 2014/0030106 A1* | 1/2014 | Schreiber | F04D 29/324 |
| | | | 156/60 |
| 2017/0044681 A1* | 2/2017 | Li | F04D 29/388 |

FOREIGN PATENT DOCUMENTS

| | | |
|---|---|---|
| EP | 2693061 A2 | 2/2014 |
| GB | 2482247 A | 1/2012 |
| WO | 2015160527 A1 | 10/2015 |

\* cited by examiner

METHOD FOR PRODUCING A METAL REINFORCEMENT FOR A TURBOMACHINE BLADE

The present invention relates to the technical field of turbomachines and more particularly to that of fan blades made of composite material.

The use of composite materials makes for a more lightweight blade, in comparison to a metal blade.

However, with such composite blades there is the risk of damage owing to delamination or decohesion between fibers and resin matrix.

These blades are more sensitive to the impact of foreign bodies, such as birds.

This is why it is known practice to equip these fan blades made of composite material with a metal reinforcement which extends over the entire height of the blade and covers its leading edge. Such a reinforcement is for example described in documents FR 2 732 406 and EP 1 908 919.

Thus, the invention relates more particularly to a metal reinforcement for a turbomachine blade made of composite material, as well as to a method for producing such a reinforcement.

Conventionally, this metal reinforcement can be produced entirely by milling, from a block of metal, for example a block of titanium.

However, a blade has a complex shape, with in particular a double camber, such that this reinforcement requires numerous reworking operations and complex tools. This leads to high production costs.

This is why alternative techniques have been developed.

Mention may thus be made of document FR 2 961 866 which describes a method for producing a metal reinforcement including successive steps of forging a metal bar, to perform bending, filling, extrusion and finally twisting operations, to bring the fins closer together and calibrate the thicker section.

It has been found, primarily, that the last few forging steps are difficult to carry out, given the undercuts that the reinforcement presents.

Thus, document FR 3 009 982 proposes a method for forging a reinforcement using a specific tool for shaping each of the lateral fins of the reinforcement.

In general, a forging method can cause folds in the fins during twisting, primarily caused by the thinness of the fins. In addition, when the fins are closed, each point of the part being formed is not moved in one plane, but in three dimensions. Thus, the tool will first touch certain portions of the part before others because the part is highly warped. The forces are therefore different depending on the area, which can also create folds.

Furthermore, significant wear of forging tools and in particular of the extrusion tool is likely since they have a V-shape.

This is why it is difficult to accurately obtain the desired geometry for the bottom (inside) radius of the reinforcement. However, it is difficult or even impossible to check the geometry and carry out any adjustments necessary, since this zone is not very accessible after the fins are closed.

In addition, forging methods include a large number of manufacturing steps, which increases the cost of the reinforcements.

Lastly, it is difficult to obtain very thin thicknesses for the fins by means of these forging methods.

Document US 2011/0274551 describes another method which also uses a forging step to bend a plate made of metal and a machining step to make a slot in the thickness of the plate. This method also includes a step of superplastic forming in a mold, by virtue of the introduction of a hot gas inside the plate.

This method therefore comprises, once again, numerous manufacturing steps. Furthermore, the superplastic forming step does not allow precise control of the internal surface of the reinforcement and in particular its bottom radius, something which is essential, however, to allow the composite blade to be inserted and held in place in the reinforcement.

Furthermore, the superplastic forming step has the same drawbacks as a forging method. To be specific, checking and adjusting the interior of the part are difficult to achieve, while shaping can cause folds to appear.

In general, all the known methods require numerous manufacturing operations, including milling, forming and/or forging steps. These methods therefore take a relatively long time to carry out, which increases the cost of the reinforcements obtained and leads to a significant amount of materials tied up in production.

In addition, there may be considerable spread in the dimensions of the parts. To be specific, these methods do not directly result in reinforcements with fins of the expected thickness, which is of the order of 0.5 mm. It is therefore necessary to perform a finishing step, in particular by milling, to obtain the final thickness of the fins and the expected aerodynamic profile.

Furthermore, as the interior of the part was produced by forming there is therefore a fairly large spread. The external profile of the part must match that of the inside of the part which is determined by a three-dimensional measurement (for example by probing). This is a long and complex process which can lead to incompatibilities with the tolerances of the part and may result in rejects.

Moreover, as the part is relatively flexible, it is necessary to provide complex tools to hold it firmly in place without deforming it while it is being machined.

In conclusion, the methods mentioned herein are complex, with controls and adjustments which are difficult because they require access to the interior of the part. The combination of these two criteria leads to products with a high risk of rejects.

This risk of spread is also observed when the method requires final shaping but certain dimensions have already been defined during machining. This is for example the case for patent WO 2009/108253 which describes a method in which the entire part is machined before forming on a mandrel to bring the fins together.

The invention aims to overcome these drawbacks by proposing a method for producing a metal reinforcement for the leading edge of a turbomachine blade making it possible to simplify the manufacturing program and reduce the manufacturing costs of this reinforcement, while retaining sufficient properties in terms of mechanical strength.

The invention thus relates to a method for producing a metal reinforcement for a turbomachine blade comprising an aerodynamic surface which extends between a leading edge and a trailing edge, said reinforcement comprising a base forming its leading edge and being extended by two lateral fins so as to define an internal surface capable of receiving the leading edge of the blade, the method comprising the following steps:

(a) obtaining at least two parts each forming at least one of the fins of the reinforcement, each part being in one piece and finished, at least one of said parts being produced by machining a metal blank, (b) assembling said parts, previously positioned on a tool, by a fusion welding or friction stir welding technique, in order to obtain said reinforcement.

Thus, the invention departs completely from conventional methods resulting in the production of a one-piece metal reinforcement.

The reinforcement parts must have high mechanical strength. This is why a person skilled in the art would a priori reject solutions resulting in the production of such parts in several pieces. To be specific, he would consider the joins between such parts to be areas of weakness. The presence of such areas is therefore incompatible with the reinforcement function attributed to the part.

The invention also departs from methods which contemplate producing a reinforcement in several pieces which are assembled by a diffusion welding technique.

To be specific, diffusion welding techniques result in barely any reduction in the properties of the constituent material of the parts at the point of assembly, unlike fusion welding or friction stir welding techniques; however, the latter are selected for the invention.

It was found, unexpectedly, that opting for these techniques had no negative consequences on the strength of the reinforcement and made it possible to benefit from all their advantages, in particular in terms of simplicity and speed of implementation.

The location of the point of assembly will be selected according to the distribution of stresses to which the reinforcement is subjected, this distribution being known when the part is designed. The invention thus makes it possible to position the point of assembly in the most appropriate place so that the reinforcement has sufficient mechanical strength.

Therefore, the presence of a point of assembly has no impact on the mechanical strength of the reinforcement.

Furthermore, this method eliminates any forging or forming step during the shaping of the reinforcement from a blank. This means that the blank to which the method is applicable can be a blank forged beforehand to optimize the material used.

With the method according to the invention, the fins are produced entirely by machining (to define the interior and exterior of the fins), in the same operation. In other words, the machining of the fin is performed without any other operation between two steps of machining this fin, which can be carried out at different times.

The method does not include any viscoplastic deformation of the material, for example by forming or forging, for the purpose of modifying the shape of the part as a whole. Furthermore, the machining is not followed by any operation aimed at modifying the section or the thickness of the fins, except possibly in the area where the parts are assembled.

The thickness of the fins and their shape are therefore perfectly controlled. In addition, the inside radius of the reinforcement is also produced by machining and it no longer undergoes subsequent geometric transformation. Its production is easy to master, unlike in known methods, which makes it possible to reduce the tolerance ranges.

Each of the component parts of the reinforcement are finished parts when assembled by fusion welding or friction stir welding. "Finished part" in this case means a part which is in its final definition in terms of shape and thickness, on the internal surface and for the most part on the external surface. In other words, only a percentage by mass between 0 and 5% is likely to be machined on the external surface of the part after it has been assembled with the other component part(s) of the reinforcement.

Thus, the method may be implemented by assembling two or three parts.

In the first case, in step (a), a first one-piece part forming one of the fins of the reinforcement and at least partially the base of the reinforcement and a second one-piece part forming at least the other fin are preferably produced.

In the second case, in step (a), a first one-piece part forming one of the fins of the reinforcement, a second one-piece part forming at least the other fin and a third one-piece part forming at least partially the base of the reinforcement are preferably produced.

Furthermore, the method may be implemented with parts which are all produced by machining a metal blank.

However, it may also be implemented to repair a damaged metal reinforcement. In this case, at least one of the parts is obtained by machining an already existing metal reinforcement.

In other advantageous embodiments, one or other of the following arrangements also applies:

In step (a), the machining of a metal blank is carried out alternately on each side of the blank to obtain said fin.

In step (a), a first and a second intermediate parts are obtained, comprising a first portion corresponding to a fin and a second portion forming a heel.

In step (a), the first intermediate part is positioned on said tool to remove or machine said heel.

In step (a), the heel of the second intermediate part is machined to at least partially form the rounded internal surface of the base and the second intermediate part is then positioned on said tool to machine the external surface of said heel and at least partially form the external surface of the base.

Before step (b), a step of texturing the internal surface of at least one of the parts is carried out, to give the part a surface condition facilitating the subsequent securing of the blade and the reinforcement.

In step (b), the point of assembly between the two parts is located perpendicular to the rounded internal surface of the base.

The invention also relates to a metal reinforcement for a turbomachine blade made of composite material comprising an aerodynamic surface which extends between a leading edge and a trailing edge, said reinforcement comprising a base forming its leading edge and being extended by two lateral fins, said reinforcement defining an internal surface capable of receiving the leading edge of the blade and comprising at least two parts each forming at least one of the fins of the reinforcement and being assembled by a fusion welding or friction stir welding technique, each part being in one piece and finished.

In other advantageous embodiments, one or other of the following arrangements also applies:
the base of the reinforcement has a rounded internal surface,
a weld relief is present on the internal surface of the reinforcement, protruding from this surface,
the point of assembly between the first part and the second part is located perpendicular to the rounded internal surface of the base,
the internal surface of the reinforcement is textured,
the reinforcement is made of steel or a titanium alloy.

Lastly, the invention also relates to a turbomachine blade made of a composite or metal material, such as aluminum, magnesium or graphene, and comprising a reinforcement according to the invention.

Preferably, this blade comprises a recess of complementary shape to the weld relief present on the internal surface of the reinforcement.

A better understanding of the invention will be obtained and further aims, advantages and features thereof will emerge more clearly on reading the following description, which is provided with reference to the appended drawings, in which:

FIG. 3 comprises FIGS. 3A to 3F which are side views showing the steps for manufacturing a first component part of a reinforcement according to the invention.

FIG. 4 comprises FIGS. 4A to 4G which are side views showing the steps for manufacturing the second component part of the reinforcement according to the invention.

FIG. 5 comprises FIGS. 5A to 5C which are sectional views showing the steps for assembly of the two component parts of the reinforcement according to the invention.

FIG. 6 includes FIGS. 6A to 6E which are sectional views showing alternative embodiments of the reinforcement according to the invention.

FIG. 7 is a perspective view showing another alternative embodiment of the reinforcement according to the invention.

FIG. 8 comprises FIGS. 8A and 8C which are sectional views showing the section through the reinforcement according to FIG. 7 in three different sectional planes.

The elements common to the various figures will be designated by the same references.

Figure 1:
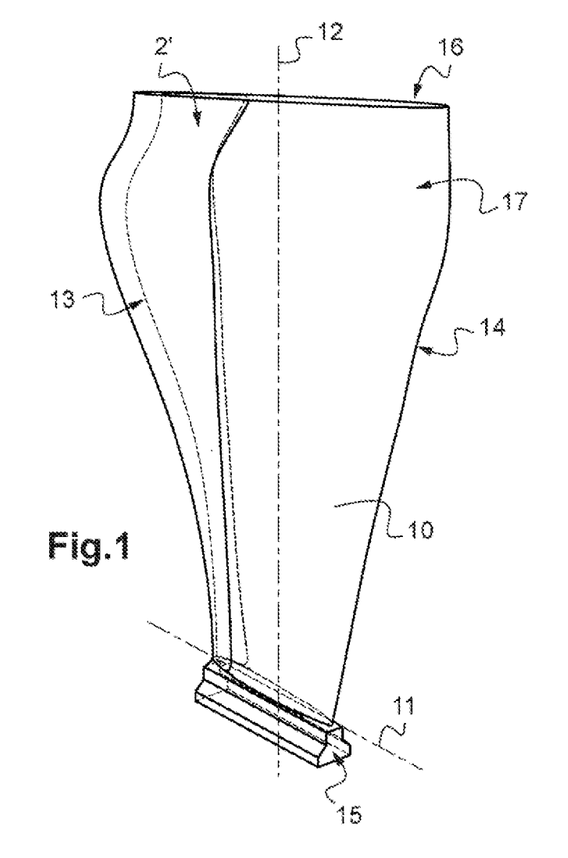
FIG. 1 is a side view of a blade comprising a metal reinforcement for a leading edge.

FIG. 1 shows a blade 1, in particular made of a composite material, for example an assembly of carbon fibers which is molded with resin by vacuum injection molding.

This blade has an aerodynamic surface 10 extending in a first axial direction 11 between a leading edge 13 and a trailing edge 14 and, in a second radial direction 12, between a root 15 and a tip 16.

This aerodynamic surface 10 therefore has two lateral faces connecting the leading edge 13 to the trailing edge 14, one forming the suction side (extrados) of the blade and the other the pressure side (intrados) of the blade. In FIG. 1, only the pressure side 17 of the blade is shown.

This blade 1 comprises a metal reinforcement 2' which is secured to the blade, in particular by adhesive bonding, so as to cover the leading edge 13. This reinforcement 2' extends in the first axial direction 11, from the leading edge 13 of the blade to a portion of the pressure side and of the suction side. It also extends in the second radial direction 12, between the root 15 and the tip 16 of the blade 1.

The reinforcement 2' is therefore designed to match the shape of the leading edge 13 of the blade. Given the shape of the blade, the reinforcement 2' therefore has a double camber, as shown in FIG. 2.

The reinforcement 2 has a substantially V-shaped section and comprises a base 21' forming the leading edge 20' of the reinforcement, which base is extended by two lateral wings 22' and 23', the wing 23' being intended to cover the suction side of the blade, while the fin 22' is intended to cover the pressure side of the blade. In the example shown, the two fins have the same length but this is not always the case.

The internal surface 200' of the reinforcement is defined inside the V and is capable of receiving the leading edge 13 of the blade 1.

Figure 2:
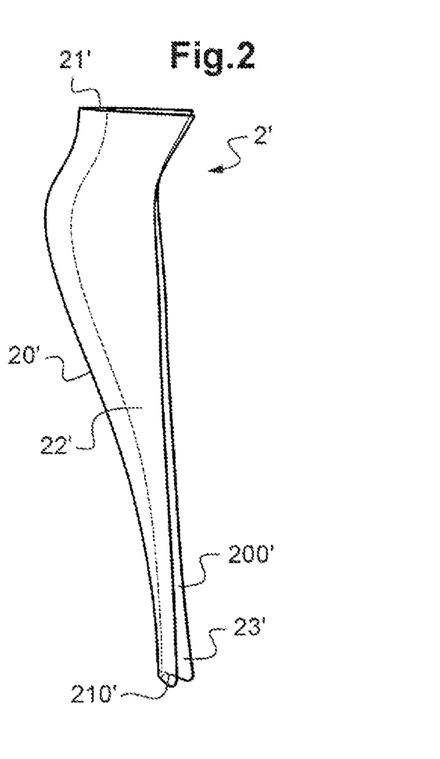
FIG. 2 is a perspective view of the leading edge shown in FIG. 1.

As shown in FIG. 2, the base 21' has a rounded internal surface 210'.

The reinforcement 2' is made of metal. A metal that has a significant capacity for absorbing energy due to shocks is chosen. This reinforcement is conventionally made of a titanium alloy or steel.

The reinforcement 2' may be adhesively bonded to the blade 1 using known adhesives, such as for example a cyanoacrylic adhesive or an epoxy adhesive. Other means for securing the reinforcement to the blade may be provided. They are selected according to the constituent materials of the blade and the reinforcement.

Figure 3A:
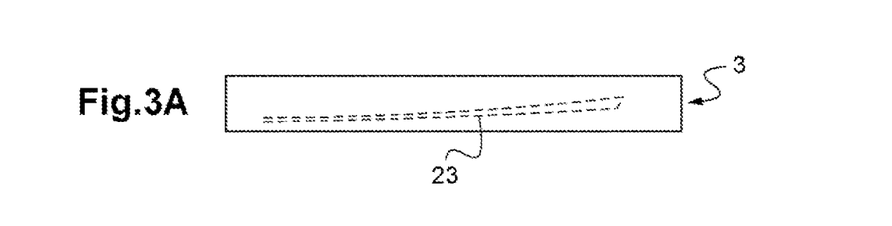
Figure 3B:
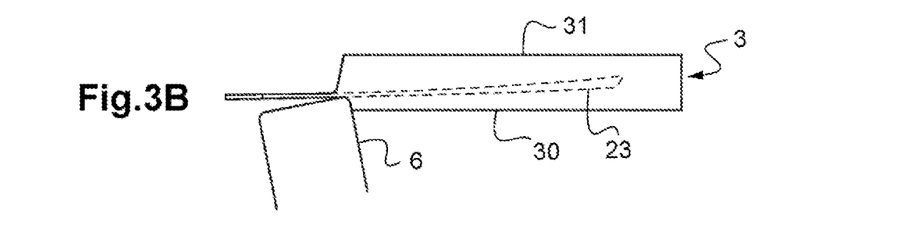
Figure 3C:
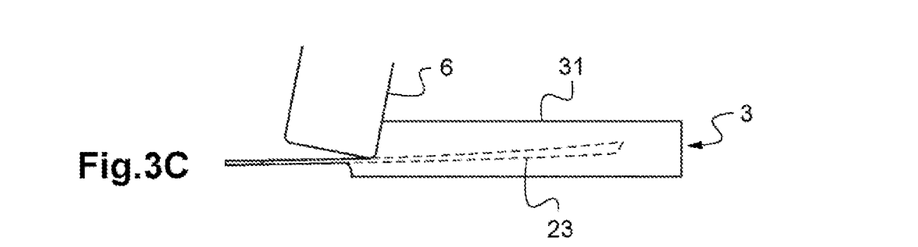
Figure 3D:
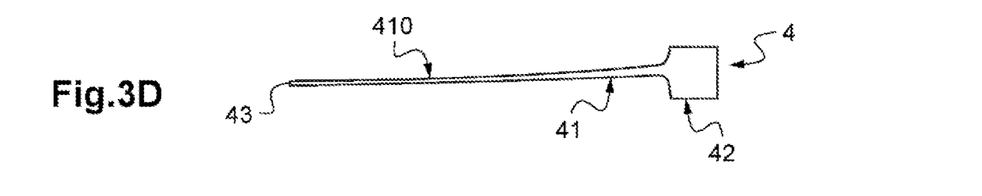
Figure 3E:
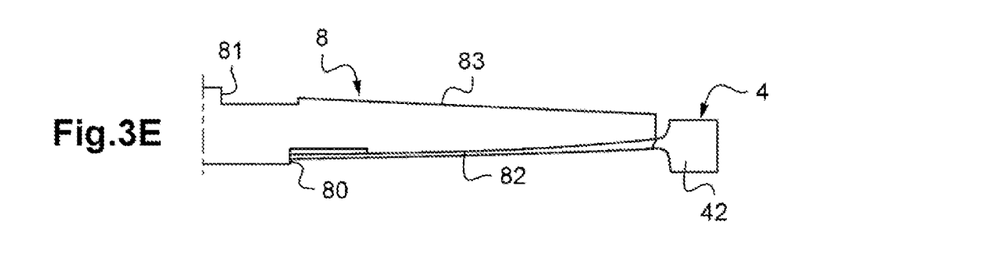
Figure 3F:
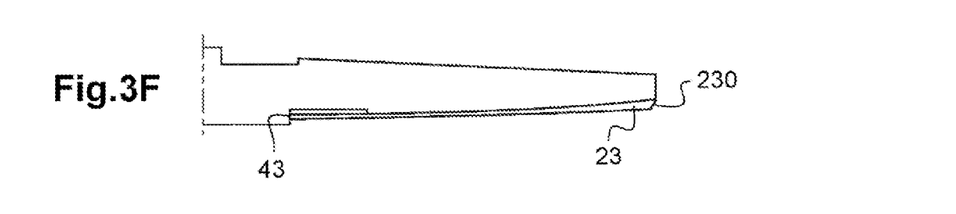
Figure 4A:
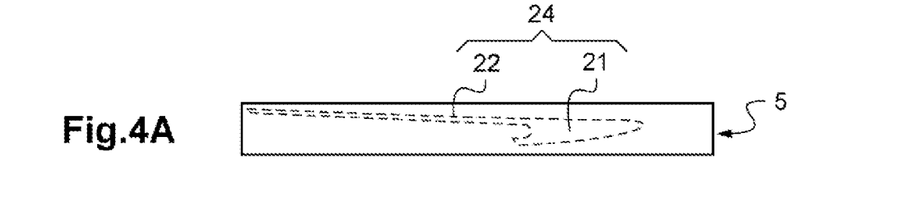
Figure 4B:
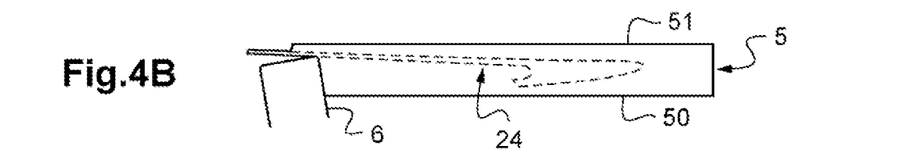
Figure 4C:
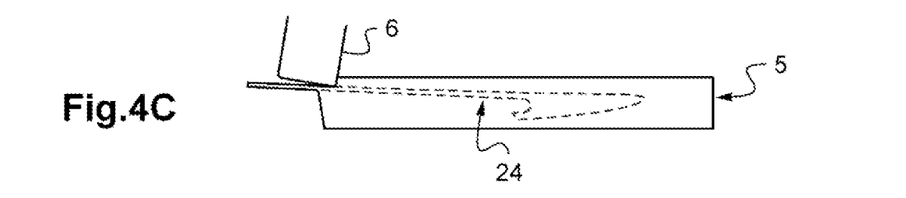
Figure 4D:
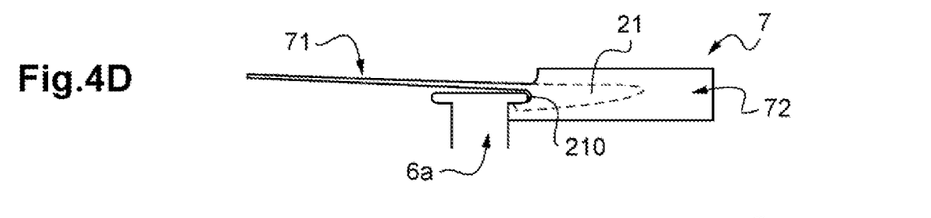
Figure 4E:
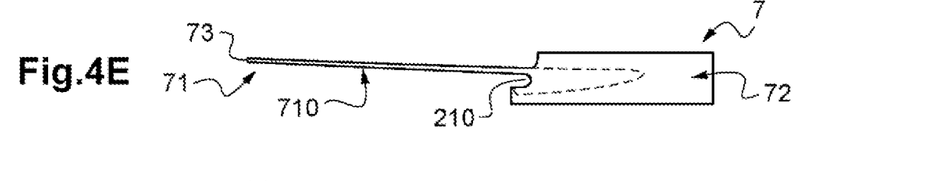
Figure 4F:
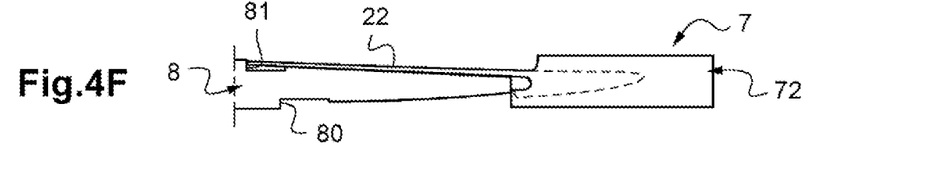
Figure 4G:
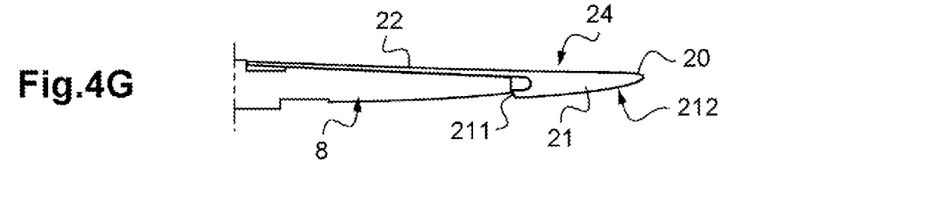
Figure 5A:
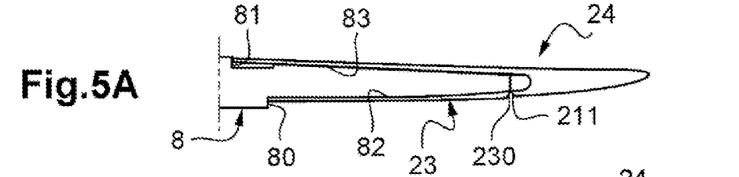
Figure 5B:
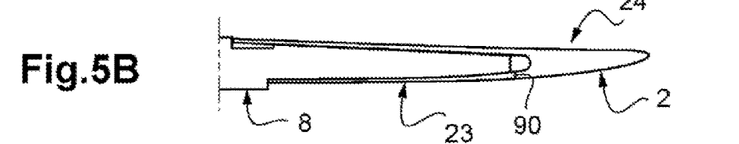
Figure 5C:
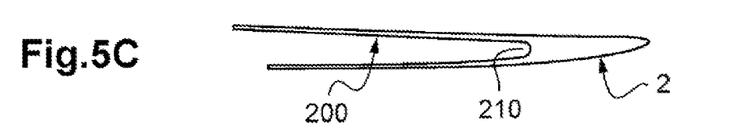

Reference will now be made to FIGS. 3 to 5 to describe a method according to the invention for the manufacture of a reinforcement as shown in FIGS. 1 and 2, but in two parts rather than a single piece.

FIG. 3 describes the steps for manufacturing a first part of the reinforcement which in this case is the suction side part of the reinforcement, that is to say the part comprising the fin intended to match the suction side of the blade.

Furthermore, FIG. 4 describes the steps for manufacturing the second part of the reinforcement which in this case is the pressure side part, that is to say the part comprising the pressure side fin intended to match the pressure side of the blade.

However, the invention is not limited to this embodiment of the method and the steps described with reference to FIG. 3 could be used to produce the pressure side part, while the steps shown in FIG. 4 could be used to produce the suction side part.

With reference to FIG. 3, FIG. 3A shows a metal blank 3 from which the first part of the reinforcement will be produced.

This blank 3 is a forged or rolled blank, for example.

Forging prior to carrying out the method makes it possible to optimize the material used and to obtain a part with good mechanical properties.

This forging step is not necessary for the implementation of the method.

The suction side fin of the reinforcement which will be obtained at the end of the manufacturing steps shown in FIG. 3 is drawn in dotted lines inside the blank 3.

The blank has a thickness much greater than the thickness of the fin, the first part undergoing machining thus remaining rigid.

FIGS. 3B and 3C show the machining operations (for example milling or grinding) carried out with the cutter 6 alternately on each face 30, 31 of the blank 3 which are opposite one another.

For example, the cutter 6 may alternately machine each face to a thickness of 10 mm.

The clamping tool for holding the blank during machining is not shown in the figures. It is positioned on the right-hand side of FIGS. 3A to 3D or on the side of the heel 42 shown in FIG. 3D.

This machining is performed from the end of the blank at the opposite end to the clamping tool (or at the opposite end to the heel 42 shown in FIG. 3D) toward this clamping tool.

With this machining technique, the rigidity of the part can remain high, making it possible to obtain good machining performance and to guarantee the thicknesses in the part and thus stay within the tolerances as far as possible.

FIG. 3D shows the intermediate part 4 which is obtained after these machining operations.

This intermediate part 4 comprises a first portion 41 corresponding substantially to the suction side fin and a second portion 42 forming a heel and corresponding to an end portion of the block 3.

Once obtained, the part 4 undergoes another machining operation to create a face 43 corresponding to the end of the fin 23 opposite the heel 42. This operation may also be carried out during machining of the blank to obtain the first portion 41.

Furthermore, on the internal face 410 of the first portion 41, a texturing step may be carried out, in order to subsequently facilitate the securing of the blade to the reinforcement according to the invention.

The thickness of the first portion 41 of this part 4 is checked, in order to make any adjustments.

As shown in FIG. 3D, the thickness of this first portion 41 is preferably variable and narrows from the second portion 42 toward the face 43. The suction side fin will therefore have this same variable thickness.

FIG. 3E shows the part 4 in position on a tool 8 which will subsequently be used for a welding operation.

This tool 8 has a tapered shape and its external surface corresponds substantially to the internal surface 200 of the reinforcement 2.

This tool 8 has two shoulders 80 and 81, the shoulder 80 being located on the suction side 82 of the tool and the shoulder 81 on the pressure side 83.

As shown in FIG. 3E, the part 4 is wedged against the shoulder 80, via its end 43. Its internal face 410 is therefore in contact with the suction side 82 of the tool.

It is also understood that the heel 42 helps to manipulate the part 4 when it is placed in position on the tool 8.

Lastly, FIG. 3F shows the last step in obtaining the suction side fin 23, in which the heel 42 is removed.

Before removing the first part 23 from the tool 8, a reference face 230 is produced at the end opposite the end 43. This reference face 230 will be useful for making the connection between the first part and the second part.

Reference is now made to FIGS. 4A to 4G which describe steps for manufacturing the second part, in this case the part comprising the pressure side fin.

FIG. 4A shows a metal blank 5 from which the second part of the reinforcement 2 will be produced.

This blank 5 is for example a forged or rolled blank.

The second part 24 of the reinforcement which will be obtained at the end of the manufacturing steps shown in FIG. 4 is drawn in dotted lines inside the blank 5. This part 24 includes the pressure side fin 22 along with the base 21 of the reinforcement 2.

FIGS. 4B and 4C show the machining operations carried out with the cutter 6 alternately on each face 50 and 51 of the blank 5 which are opposite one another.

Here again, the blank 5 is held by a clamping tool which is not shown in the figures and which is positioned on the right-hand side of FIGS. 4A to 4E or on the side of the heel 72 shown in FIG. 4E.

The machining is also performed from the end of the blank at the opposite end to the clamping tool (or at the opposite end to the heel 72) toward this clamping tool.

FIG. 4D shows the intermediate part 7 which is obtained after these machining operations.

This intermediate part 7 comprises a first portion 71 corresponding substantially to the pressure side fin and a second portion 72 forming a heel and corresponding to an end portion of the block 5.

It is in this second portion 72 that the base 21 of the reinforcement, shown in dotted lines in FIGS. 4D to 4F, will be formed.

FIG. 4D also shows a machining operation carried out with the cutter 6a, in the heel 72, in order to define the rounded internal surface 210 of the base 21 of the reinforcement.

This surface is easily produced because the inner portion of the heel is easily accessible and allows the use of a milling tool without constraint.

The radius of curvature of this internal surface 210 is defined as a function of the profile of the blade for which the reinforcement is intended. Note that the blade does not necessarily come into contact with all of this internal surface.

However, the shape of this internal surface and in particular its curvature must be controlled to avoid areas of stress concentration which could weaken the reinforcement and to allow correct positioning of the blade relative to the reinforcement.

FIG. 4E therefore shows the intermediate part 7 which then undergoes another machining operation to create a face 73 corresponding to the end of the fin 22 opposite the heel 72. This further machining operation may be performed during machining of the blank.

Furthermore, on the internal face 710 of the first portion 71 of the part 7, a texturing step may be carried out, in order to subsequently facilitate the securing of the blade to the reinforcement according to the invention. For the two parts 4 and 7, this texturing may in particular be carried out by a technique of micromachining by laser or by sandblasting.

In this step, the thickness of the first portion of the part 7 is checked, in order to make any adjustments.

As shown in FIG. 4E, the thickness of this first portion 71 is preferably variable and narrows from the heel 72 toward the face 73. The pressure side fin will therefore have this same variable thickness.

FIG. 4F shows the part 7 in position on the tool 8.

The part 7 is wedged against the shoulder 81, via its end 73.

It is also understood that the heel 72 helps to manipulate the part 7 when it is placed in position on the tool 8.

Lastly, FIG. 4G shows the last step in obtaining the second part 24 of the reinforcement, in which the external surface of the heel 72 is machined in order to obtain the base 21 of the reinforcement with its leading edge 20 on its external surface 212.

Before removing the second part 24 from the tool 8, a reference face 211 is produced at the free end of the base 21 of the reinforcement, opposite the leading edge 20 and facing the pressure side fin 22.

This reference face 211 will be useful for making the connection between the first part and the second part.

Reference is now made to FIGS. 5A to 5C which show how the first part 23 and the second part 24 are assembled.

It should be emphasized here that, when they are assembled, these two parts 23 and 24 are finished parts, their shape and their dimensions being substantially unchanged in the reinforcement obtained after assembly.

This concept will be defined more precisely in the remainder of the description.

FIG. 5A shows the step in which these two parts are placed on the welding tool 8.

Thus, the internal face 410 of the first part 23 is in contact with the suction side 82 of the tool, while its end 43 bears against the shoulder 80.

Likewise, the second part 24 is placed on the tool 8, by bringing its internal face 710 into contact with the pressure side 83 of the tool. Moreover, the second part 24 is wedged against the shoulder 81, via its end 73.

In the position shown in FIG. 5A, the reference face 230 of the first part 23 is facing the reference surface 211 of the second part 24.

FIG. 5B shows the next step in which a weld 90 is made between the reference faces 230 and 211.

The assembly technique used is a fusion welding or friction stir welding technique which is adapted in particular to the nature of the materials to be welded. It may be a laser welding technique, such as MIG/MAG or TIG, or electron beam welding, for example.

The energy used is relatively low because the thicknesses involved are likewise small. To be specific, the weld is made between the thicknesses of each fin, which are small, in particular between 0.5 and 3 mm.

It must be pointed out here that fusion welding techniques are generally used for blanks of parts because they cause deformation and require subsequent treatments to release stresses. They are also used for massive parts less sensitive to deformation. In mechanical welding, fusion welding techniques are used to obtain parts of simple geometry and rough dimensions which therefore require subsequent machining and treatment to release stresses. They are also used for parts of small dimensions (of a few cms) in which the deformations caused by the welding are compatible with the expected tolerances, which are not very tight. These parts therefore do not undergo any subsequent operation and in particular, no post-welding machining.

With regard to friction stir welding techniques, their use is not widespread and, in general, confined to welds along simple paths and generating relatively large weld areas, necessitated by the tools used.

It is therefore not obvious for a person skilled in the art to use these techniques to produce large, complex or warped parts with tight tolerances, and for relatively fine weld areas.

However, it was found that by positioning the weld in areas in which the relative stiffness is low, the deformation of the reinforcement and the local variation in thickness caused by the weld were compatible with the tolerances of the reinforcement, which are typically 2 mm for the entire external surface of the reinforcement, and + or −0.2 mm for the thickness of the fins.

For example, the weld will thus be positioned in an area of the fin close to the nose instead of in the nose of the reinforcement because it has a lower stiffness due to the section ratio.

Furthermore, these techniques have the advantage of being simple and quick to implement, unlike diffusion bonding techniques. This is in particular due to the fact that diffusion bonding requires a furnace and holding tools that are compatible with the material to be welded.

After this welding step, a surface treatment or a heat treatment may be carried out. These treatments are optional.

In the case of heat treatment, this may for example consist of stress release or placing in solution, to modify the mechanical properties of the weld.

It is also possible to provide for a straightening Or calibration operation to remedy any minor deformations that have occurred during welding or an operation for minor addition or removal of material to correct any geometric deviations associated with the welding. This is simply a finishing operation and in particular depends on the welding technique used.

Lastly, it is preferable to perform polishing to improve the aerodynamic properties of the reinforcement.

All of these operations have a minor impact on the shape and size of the parts, which is why the parts are deemed to be finished parts before assembly.

Thus, the sum of the masses of the component parts of the reinforcement before assembly is greater than 95% of the mass of the final reinforcement which is intended to be secured to the blade and which has therefore possibly undergone one or more finishing operations.

In other words, after assembly of its component parts, the reinforcement may locally include excess thicknesses or excess lengths (for example excess lengths allowing the ends of the part to be machined or excess thicknesses allowing the polishing to be carried out).

It is understood that because the reference faces 230 and 211 are produced while the corresponding part is in place on the same tool, the positioning of the two parts is guaranteed with precision, during the assembly step.

In other words, the method according to the invention requires only a single tool used in all the steps of the method making it possible to obtain a reinforcement having a precise shape and dimensions, thanks to a common frame of reference.

However, in certain cases, it may be advantageous to use several tools, in particular for reasons linked to organization of the production line.

Furthermore, it goes without saying that control steps may be performed throughout the operations which have been described with reference to FIGS. 3 to 5.

The thicknesses of the fins are obtained by a single machining phase unlike known methods and by a strategy maximizing the rigidity of the part. This makes it possible to obtain the expected dimensions, with optimum reproducibility with regard to the thickness of the fins and the shape of the bottom radius, which are key features of the reinforcement.

Thus, tolerances of ±0.02 mm can be obtained with the method according to the invention as regards the thicknesses, in particular those of the fins.

Furthermore, for the general shape of the reinforcement, a tolerance of 0.5 mm can be obtained.

In other words, there is very little spread in the dimensions of the reinforcements obtained with the method according to the invention.

Moreover, the surface condition of the internal face of each of the parts is easily achieved since a specific tool can easily access this internal face, unlike methods in which one-piece reinforcements are formed.

FIG. 5C shows the reinforcement 2 obtained after its removal from the tool 8. The reinforcement is then ready to be secured to the blade 1, subject to a possible finishing operation as defined above. It has the same shape as the reinforcement 2' shown in FIGS. 1 and 2.

In the embodiment of the method which has just been described, the assembly by welding is carried out between the suction side fin 23 and the base 21 of the reinforcement and more precisely perpendicular to the rounded internal surface 210. In other words, the weld extends substantially at right angle to this internal surface.

The invention is however not limited to this embodiment and the junction between the two parts could be located at another location on the rounded internal surface 210 of the base 21 of the reinforcement which is located at the bottom of the internal surface 200 of the reinforcement.

In the example shown in FIG. 5, the junction or assembly area 90 corresponds to the entrance to this internal surface 210.

Figure 6A:
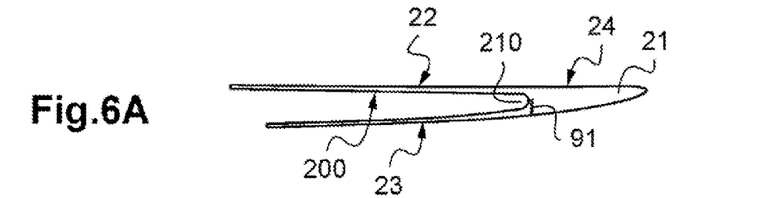

In the embodiment shown in FIG. 6A, this junction area 91 is shifted beyond this internal surface 210 while remaining close to the bottom of this surface.

Figure 6B:
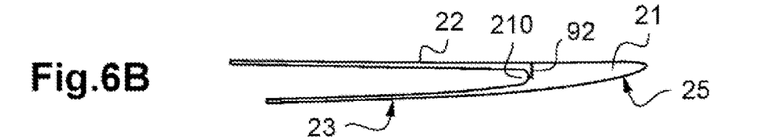
Figure 6C:
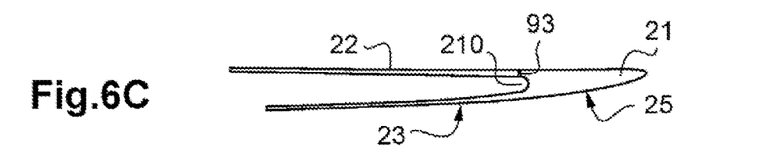

FIGS. 6B and 6C correspond to two other embodiments of the method according to the invention in which the second part corresponds to the pressure side fin 22 of the reinforcement while the first part 25 comprises the suction side fin 23 and the base 21 of the reinforcement.

In the example shown in FIG. 6B, the junction area 92 between the parts 22 and 25 is located beyond the internal surface 210 of the base 21, while FIG. 6C shows the embodiment in which the junction area 93 is located at the entrance to this internal surface 210 and perpendicular thereto (reverse of FIG. 5A).

In the embodiment of the method which has just been described, the intermediate part 4 shown in FIG. 3D is intended to form a fin, while the intermediate part 7 is intended to form the other fin and the base of the reinforcement.

The invention is however not limited to this embodiment and each intermediate part may be intended to form a fin and a portion of the base of the reinforcement, the two parts then being complementary.

Likewise, in this example, the reinforcement is obtained from two parts obtained by machining a blank.

The invention is however not limited to this embodiment and the reinforcement may also be obtained from three parts, for example, each obtained by machining a blank. By way of illustration, a first part may form a fin, a second part the other fin and a third part the base of the reinforcement.

Likewise, the reinforcement may be obtained from an already existing but defective reinforcement. In this case, at least one component part of the reinforcement is obtained by machining this existing reinforcement while at least one other component part is obtained by machining a blank. The assembly of the parts thus makes it possible to repair the defective reinforcement.

Figure 6D:
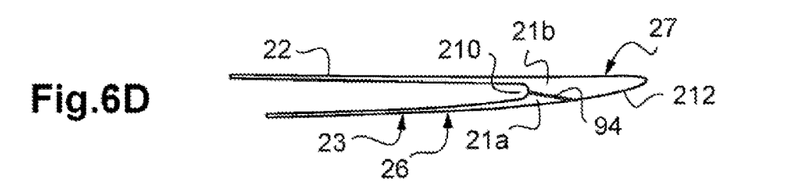
Figure 6E:
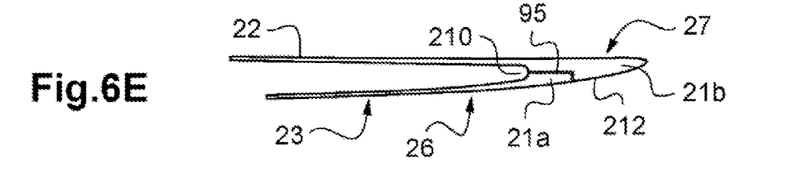

Reference is now made to FIGS. 6D and 6E which show that the first part 26 comprises the suction side fin 23 and a first portion 21a of the base 21 of the reinforcement while the second part 27 comprises the pressure side fin 22 and a second portion 21b of the base 21, complementary to the first portion 21a.

In the example shown in FIG. 6D, the line of the junction area 94 extends from the bottom of the surface 210, at an angle, as far as the external surface 212 of the base 21, while in the example shown in FIG. 6E, the trace of the area 95 extends along two straight lines which are substantially perpendicular.

In this case, the assembly area is located in the base itself. The assembly then causes little deformation due to the thickness of the base. This solution will be adopted if the junction area is located in a region of the reinforcement subject to little stress.

The location of the assembly area will be selected according to the mechanical stresses that the blade must withstand. However, in all cases, it is preferable that the weld area be at a distance from the end of the base 21 opposite the fins.

It will be understood that FIGS. 5B and 6A to 6E show a section of the reinforcement taken at a certain level of the height of the reinforcement.

This section shows the position of the assembly between the two parts forming the reinforcement.

This position may be the same over the entire height of the reinforcement.

However, depending on the stresses to which the reinforcement is subjected, it may also be designed so that the position of the assembly between the two parts varies over the height of the reinforcement.

This is shown by FIGS. 7 and 8A to 8C.

Figures 7, 8B, 8C:
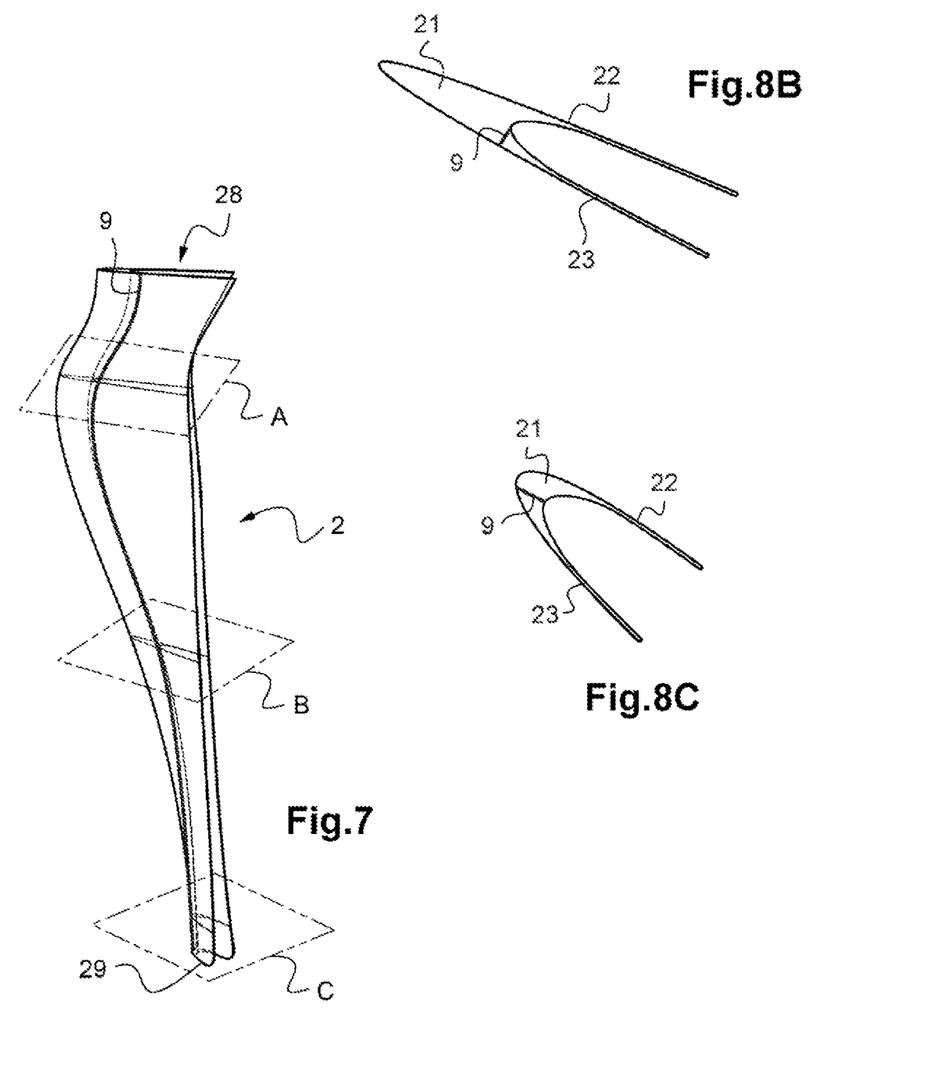

FIG. 7 shows a reinforcement 2 according to the invention having the same shape as the reinforcement 2' of FIGS. 1 and 2, identifying the assembly area 9 or join line between the two component parts of the reinforcement.

Three sectional planes are also identified: the plane A located near the tip 28 of the reinforcement,
the plane B located in an intermediate area and
the plane C located at the root 29 of the reinforcement.

Figure 8A:
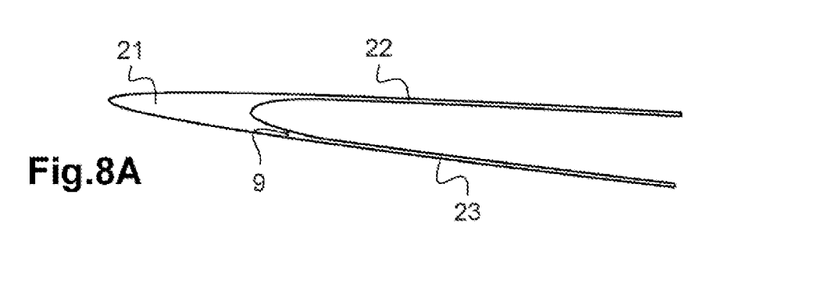

As shown in FIGS. 8A to 8C, the position of the assembly area differs from plane to plane.

Thus, FIG. 8A shows that this area 9 is located between the suction side fin 23 and the base 21 of the reinforcement, as shown in FIG. 5C.

On the other hand, FIG. 8B shows that this area 9 is shifted toward the base 21 of the reinforcement, in a manner similar to the variant shown in FIG. 6A.

Lastly, at the root 29 of the reinforcement, the assembly area 9 is located in the base 21 of the reinforcement and near the fin, in a manner similar to the variant shown in FIG. 6D.

It is also possible to select the position of the weld so that the thickness of the area to be welded is substantially constant over the entire height of the reinforcement. This is because the fins generally have a variable profile over the height of the reinforcement and it may be preferable for the welding parameters to be constant throughout welding to make the welding easier to perform.

It is understood that assembly may be carried out by implementing the same fusion welding technique over the entire height of the reinforcement or by using different techniques depending on the portion of the reinforcement in question.

Making the weld creates a relief in the interior space of the reinforcement. This cannot be eliminated by machining because it is inaccessible to a machining tool. In the context of the invention, this relief will indeed not be removed.

Thus, the trace of the weld will still be visible inside the reinforcement after its manufacture.

When the blade and the reinforcement are assembled only by adhesive bonding, this relief should not interfere with the positioning of the reinforcement on the blade. This is why, if the leading edge 13 of the blade is not intended to come into contact with the bottom of the internal surface 210 of the base 21, it will be preferred to position the weld area in the bottom of this internal surface to avoid any contact between the weld and the blade.

It is also possible to provide for an assembly between the blade and the reinforcement combining adhesive bonding and mechanical engagement. Since the manufacturing method makes it possible to obtain a relief like a bead inside the reinforcement, this relief can be used to strengthen the connection between the blade and the reinforcement by making a recess on the blade with a complementary shape to the bead.

In general, it is observed that the method according to the invention makes it possible to reduce materials tied up in production, in particular because it does not include any long heating step prior to forming.

The machining strategy affords significant efficiency. Moreover, this method can also allow the production of prototypes more quickly than other methods because it can be implemented without heavy equipment (presses, forming tools made of refractory materials that take a very long time to supply and are very expensive, lengthy development). It requires a minimum of a machining apparatus comprising the cutting tool, a machining tool to clamp the blanks during machining and an assembly tool.

Lastly, this method makes it possible to obtain reinforcements of complex shape since it allows access to the bottom of the reinforcement, with in particular an internal surface having a smaller radius of curvature and a specific texture inside the reinforcement. It also allows for reinforcements with longer fins, thereby covering a larger area of the blade and providing a stronger interface between the reinforcement and the blade to which it is adhesively bonded.

As goes without saying and as is moreover clear from the above, the present invention is not limited to the embodiments more particularly described. On the contrary, it encompasses all variants thereof and in particular the variant in which the blade is not made of a composite material but, for example, of aluminum with a reinforcement of steel or titanium alloy.

The invention claimed is:

1. A method for producing a metal reinforcement (2) for a turbomachine blade (1) comprising an aerodynamic surface (10) which extends between a leading edge and a trailing edge (14), said reinforcement comprising a tapered base (21) forming its leading edge (20), having an external surface (212) and being extended by two lateral fins (22, 23) so as to define an internal surface (200) capable of receiving the leading edge of the blade, the method comprising the following steps:
    (a) providing component parts, a first component part (24, 25, 26) forming one of the fins (22, 23) of the reinforcement and at least partially the tapered base (21) of the reinforcement and a second component part (23, 22, 27) forming at least the other fin (23, 22), each component part being in one piece and finished, and producing at least one of said component parts by machining a metal blank,
    (b) positioning said component parts on a tool (8),
    (c) assembling said component parts by a fusion welding or friction stir welding technique to obtain assembled component parts,
    (d) removing the reinforcement from the tool, said reinforcement being intended to be secured to the blade,
    wherein the sum of the masses of the component parts of the reinforcement before assembly is equal or greater than the mass of said reinforcement,
    and wherein the only step between steps (c) and (d) which may change the shape or size of the assembled component parts is a machining step on the external surface of the assembled component parts to remove a percentage by mass between 0 and 5% of the sum of the masses of the component parts of the reinforcement before assembly.

2. The method as claimed in claim 1 wherein said component parts are all produced by machining a metal blank.

3. The method as claimed in claim 1, wherein at least one of said component parts is obtained by machining an already existing metal reinforcement.

4. The method as claimed in claim 1 wherein the machining of a metal blank is carried out alternately on each side (30, 31; 50, 51) of the blank (3, 5).

5. The method as claimed in claim 1 wherein the first component part is obtained from a first intermediate part and the second component part is obtained from a second intermediate part, each of the intermediate parts comprising a first portion (41, 71) intended to form a fin (23, 22) and a second portion (42, 72) forming a heel, the heel of one of said first and second intermediate parts being intended to form the base (21) of the reinforcement.

6. The method as claimed in claim 5 wherein, in step (a), the first intermediate part (4) is positioned on said tool (8) to remove or machine said second portion (42) to obtain the first component part and to produce a first reference face (230) on the first component part.

7. The method as claimed in claim 6 wherein, in step (b), the first component part and the second component part are placed on the tool (8), the first reference face (230) of the first component part facing the second reference face (211) of the second component part.

8. The method as claimed in claim 5 wherein, in step (a), the second portion (72) of the second intermediate part (7) has an external surface and is machined to at least partially form a rounded internal surface (210) of the base (21) and the second intermediate part (7) is then positioned on said tool (8) to machine the external surface of said second portion and at least partially form the external surface (212) of the base (21) to obtain the second component part and to produce a second reference face (211) on the second component part.

9. The method as claimed in claim 1 wherein, before step (b), a step of texturing an internal surface (410, 710) of at least one of the parts is carried out.

10. The method as claimed in claim 1 wherein in steps (b) and (c), after positioning of the component parts on the tool, a space remains between an end of the tool and the internal surface of the base of the reinforcement.

* * * * *

UNITED STATES PATENT AND TRADEMARK OFFICE
CERTIFICATE OF CORRECTION

| | |
|---|---|
| PATENT NO. | : 11,759,895 B2 |
| APPLICATION NO. | : 17/415067 |
| DATED | : September 19, 2023 |
| INVENTOR(S) | : Bosselut |

It is certified that error appears in the above-identified patent and that said Letters Patent is hereby corrected as shown below:

In the Claims

Column 13, Claim 1, Line 27:
After "providing", insert --two-- therefor

Column 13, Claim 1, Line 43:
After "reinforcement,", insert --and-- therefor

Column 13, Claim 1, Line 44:
Before "wherein", delete "and" therefor

Signed and Sealed this
Twenty-seventh Day of February, 2024

*Katherine Kelly Vidal*

Katherine Kelly Vidal
*Director of the United States Patent and Trademark Office*